United States Patent
Forry et al.

(10) Patent No.: US 6,247,703 B1
(45) Date of Patent: Jun. 19, 2001

(54) HIGH-PRESSURE COMPRESSION-FAILURE RESISTANT AND HIGH SEALING GASKET

(75) Inventors: John S. Forry, Lancaster; Brian C. Lehr, Pequea, both of PA (US)

(73) Assignee: Interface Solutions, Inc., Lancaster, PA (US)

( * ) Notice: Subject to any disclaimer, the term of this patent is extended or adjusted under 35 U.S.C. 154(b) by 0 days.

(21) Appl. No.: 08/920,662

(22) Filed: Aug. 29, 1997

(51) Int. Cl.[7] .................... F02F 11/00; F16J 15/08
(52) U.S. Cl. .................... 277/592; 277/627; 277/652
(58) Field of Search .................... 277/627, 652, 277/592

(56) References Cited

U.S. PATENT DOCUMENTS

| | | | |
|---|---|---|---|
| 1,772,173 | * 8/1930 | Yates | 277/627 |
| 2,070,918 | * 2/1937 | Peterson | 277/592 |
| 2,289,620 | * 7/1942 | Bernstein | 277/592 |
| 3,302,953 | * 2/1967 | Glasgow . | |
| 3,355,181 | * 11/1967 | Olson . | |
| 3,655,210 | * 4/1972 | Farnam et al. | 277/592 |
| 3,661,401 | * 5/1972 | Farnam . | |
| 3,729,205 | * 4/1973 | Kwok . | |
| 3,785,856 | * 1/1974 | Gotoh | 277/944 |
| 3,837,657 | * 9/1974 | Farnam et al. | 277/312 |
| 3,854,736 | * 12/1974 | Farnam . | |
| 3,890,183 | * 6/1975 | Farnam | 156/193 |
| 3,970,322 | * 7/1976 | Stecher et al. | 277/592 |
| 4,103,913 | * 8/1978 | McDowell | 277/235 |
| 4,434,989 | * 3/1984 | Beyer et al. | 277/592 |
| 4,499,135 | 2/1985 | Mitchell et al. | 428/137 |
| 4,600,201 | 7/1986 | Lonne et al. | 277/1 |
| 4,601,476 | * 6/1986 | Usher et al. | 277/627 |
| 4,635,949 | * 1/1987 | Lucas et al. . | |
| 4,741,965 | 5/1988 | Zerfass et al. | 428/447 |
| 4,746,130 | * 5/1988 | Abele . | |
| 4,795,166 | * 1/1989 | Irmler | 277/627 |
| 4,932,673 | * 6/1990 | Domnikov et al. | 277/627 |
| 5,033,756 | * 7/1991 | Sixsmith et al. | 277/627 |
| 5,082,297 | * 1/1992 | Flasher . | |
| 5,145,190 | * 9/1992 | Boardman . | |
| 5,150,910 | * 9/1992 | Udagawa | 277/592 |
| 5,180,631 | * 1/1993 | Amano | 277/944 |
| 5,194,696 | * 3/1993 | Read . | |
| 5,240,766 | 8/1993 | Foster | 428/280 |
| 5,286,574 | * 2/1994 | Foster | 277/591 X |
| 5,518,257 | * 5/1996 | Breaker | 277/627 |
| 5,536,565 | 7/1996 | Halout et al. | 428/283 |
| 5,667,227 | * 9/1997 | Boldt | 277/652 |

OTHER PUBLICATIONS

The Technologies Behind Fel–Pro's Specialty Sealing Products.

* cited by examiner

Primary Examiner—Chuck Y. Mah
Assistant Examiner—Vishal Patel
(74) Attorney, Agent, or Firm—Womble Carlyle Sandridge & Rice

(57) ABSTRACT

A gasket which is compression-failure resistant, even at operating flange pressures in the range of from about 3,000 to about 15,000 PSI and also has a good sealing ability, comprises a soft gasket material having two opposed, facial surfaces and an aperture with an edge perpendicular to the facial surfaces, wherein the edge of the aperture has a polymer coating (coating A) on the edge for a good sealing ability. In this embodiment, except for coating A, the gasket is otherwise not coated which makes the gasket compression-failure resistant. In embodiments which need even better sealing ability, at least one of the opposed, facial surfaces has polymer coating B, which may abut both the edge and polymer coating A, wherein polymer coating B on the facial, opposed surface leaves the gasket uncoated for sealing ability in an amount effective to give the gasket compression failure resistance.

10 Claims, 4 Drawing Sheets

HIGH-PRESSURE COMPRESSION-FAILURE RESISTANT AND HIGH SEALING GASKET

BACKGROUND OF THE INVENTION

Field of the Invention

Performance characteristics required of many gaskets includes both compression failure resistance and sealing ability. Gaskets frequently must operate under pressures in the range of from about 3,000 to about 30,000 PSI (pounds per square inch). At the same time the gasketing is also required to provide a seal against fluids.

In some instances, in order to provide a good seal, gasketing is coated to get sealing ability. Fibrous gaskets or soft porous materials are types of gasketing which is given coatings since this gasketing is very porous and has problems in giving an adequate seal for use. Unfortunately, the coating used to give sealing ability penetrates the gasket, and reduces the ability of the gasket to withstand pressure. It would be beneficial to develop a gasket which delivers good sealing ability which, at the same time, is compression-failure resistant, especially if the gasket could operate at flange pressures in the range of from about 20 to about 30,000 PSI.

Gasketing which is presently known in the art includes gaskets described by U.S. Pat. No. 3,661,401 which requires that the gasketing be given a coating which covers the walls of the apertures in addition to the gasketing faces. Such gasketing, however, being completely coated, will perform poorly at such high pressures. This severely limits the field of use of the gaskets.

The present invention beneficially provides gaskets which have an adequate sealing ability and are compression-failure resistant. Gaskets which are capable of withstanding operating pressures of at least 3,000 PSI are provided. Furthermore, gaskets which operate well in the range of from about 20 to about 30,000 PSI are provided; the present gaskets remarkably being capable of sealing at both high and low flange pressures.

SUMMARY OF THE INVENTION

In accordance with the present invention, a soft gasket material has two opposed surfaces (faces), said gasket having an edge perpendicular to the facial surfaces. The edge has a surface which is given a coating. Where the edge is on an aperture, the coating on the edge of the aperture gives the gasket a primary seal against fluid leaks that would come from the aperture across the porous edge of the soft gasket material and into the gasket. A coating on a perimeter edge gives only a secondary seal.

The opposed, facial surfaces, however, have only a limited coating in order to preserve compression failure resistance. The more coating that is given to the face of the gasket the more loss of compression failure resistance there is. Having a portion of the gasket surface uncoated provides better compression failure resistance than the gasket would have with a sealing coating on at least some of the uncoated surface. Release coatings are permitted and optionally, in any given application the gasket can be given a release coating which does not cause compression failure. Preferably, no coating for sealing ability can be made on gasketing which would cover more than about 50% of either or both faces. More preferably, for more compression failure resistance, no more than about 30% of both faces are coated for sealing ability. Most preferably, in fact, the opposed, facial surfaces are not substantially coated with sealing coatings. Having substantially no coating on either face of the gasket will give the gasket a better compression failure resistance than the gasket would have if the same gasket did have a coating on up to about 30% of both faces or even on some portion of at least one face.

The coating permitted on the opposed, facial surfaces (the face) is limited to 1) a sealing coating on one or both gasket faces while leaving uncoated portions on one or both gasket faces, the uncoated portions of the gasket being present in an amount effective to give the gasket better compression failure resistance than it would have if at least a portion of the uncoated surface was coated, and/or 2) release coatings which do not substantially affect compression-failure resistance and do not substantially penetrate the gasket.

Suitably, the coating on the edge covers all of the portions of the edge which must be coated in order to give the gasket a good sealing ability. Preferably, however, the entire edge is coated. The coating of the entire edge will allow the gasket to provide a better seal. Acceptable embodiments include, however, instances where the coating covers major portions of the edge. The edge can, thus, be coated in an effective amount to achieve a substantial sealing of the gasket along the edge of the aperture. The edge, for example, can be coated up to about 75% of the aperture's edge. Such embodiments can be used for good sealing ability, where the very best sealing ability obtained from coating the entire edge of the gasket does not have to be used. If, for example, a bolt area was near the aperture, the high pressure near the bolt may decrease the need for a full coating of the edge. A bolt area is an area near or under the bolt where higher pressure is put on the gasket than on areas further away from the bolt.

In another embodiment the edge of the gasket sheet material contains pores into which the coating material on the edge has penetrated. This helps to seal off pores and gives the gasket sheet a better sealing ability.

A wide edge-coating on a gasket sheet edge which covers the edge from corner to corner and extends beyond the corner, protruding past the corner plane (past the corner) in a direction perpendicular to the facial plane, will give the gasket a better sealing ability, especially since it can seal against two types of fluid flow; both through the gasket and across the gasket face. This is particularly true for an edge which has been cut in the gasket. The cut edge will have more pores than another surface which is not cut even in porous and compressible gaskets. Coating the edge so that the coating penetrates or closes off the pores will be effective to seal off the pores to fluid which could seep through the gasket.

Where a gasket has both the aperture's edge coated and a coating on a portion of at least one face which abuts an aperture and forms a border around the aperture, the edge coat is arbitrarily designated coating A (in this description) while the coating on the face abutting the aperture is designated coating B; a coating on the edge which is around the outside (periphery) of the gasket material is coating C.

Different coating materials may be used to form coating A and B, although it is also permissible to coat the different areas with the same coating material.

As more coating for sealing ability is put on the gasket faces, the performance of the gasket in response to higher pressures will deteriorate, even if the coating on the face is limited to a strip of coating abutting the aperture's coated edge on at least one side of the gasket. For this reason, therefore, it is preferred that coating B, abutting the aperture's coated edge should be limited in width, so that it covers only a limited portion of the gasket face(s). Preferably, the coating (coating B) on at least one gasket face, abutting the aperture's coated edge can be up to about 1.5 centimeters wide on the face. Preferably, such coating strips, on the face of the gasket and abutting the aperture, can cover up to about 50% of one or both faces.

As the data of Example 8 herein demonstrates, for preferred embodiments it can also be important to limit the thickness of the coating on each gasket face. The thicker the coating on the face of the gasket the lower the pressure at which compression failure of the gasket occurs. Thus, coatings for sealing which are put on the gasket face are preferred to be a maximum of about 11 mils thick.

DESCRIPTION OF THE DRAWINGS

The Figures included herein show examples of certain embodiments of this invention.

In FIG. 5, the coating (16) on the vertical edge (71) of the gasket does not overlap either corner of the edge of the gasket, but does protrude past the corner planes (29) and (30) (also called facial planes since the planes contain faces (15) and (50). The coating is, thus, not found on either one of the gasket's horizontal faces as the coating (18) does in FIG. 6 and coating (22) of FIG. 8.

In FIG. 5, the thickness (or width) of the coating (16) in the direction parallel to the vertical edge of the gasket gets gradually larger going away from the gasket. The coating is wider than the vertical edge (71). The embodiment of FIG. 5 provides a gasket with a sealing ability ranging from a good seal to a total seal and simultaneously provides the best (most optimized) compression failure resistance since neither of the gasket's faces has any coating to seal the gasket. Planes (29 and 30) are shown in FIG. 5, which are facial planes (containing the face of the gasket) and corner planes (going through the corner of the gasket between the face and the edge). Similarly, FIG. 9 shows facial, corner planes (37) and (38); FIG. 10 shows facial, corner planes (39) and (65) and FIG. 12 shows facial plane (60). FIG. 11 has a facial plane (31) containing face (40) and also has a corner plane (82) which goes through the corner between the face (40) and the vertical edge (77). In this instance, the gasket of FIG. 11 as a face that has been slightly contoured by pressure applied near the aperture edge. The corner is between the cut portion of the gasket edge (77) and the facial surface (40). The corner plane (82) contains the point of the gasket where the cut edge ends and the face material (40) begins (contains the corner).

FIG. 6 shows coating (18) covering part of face (17) and all of edge (72). The coating goes to the corner between edge (72) and face (51).

Figure 7:
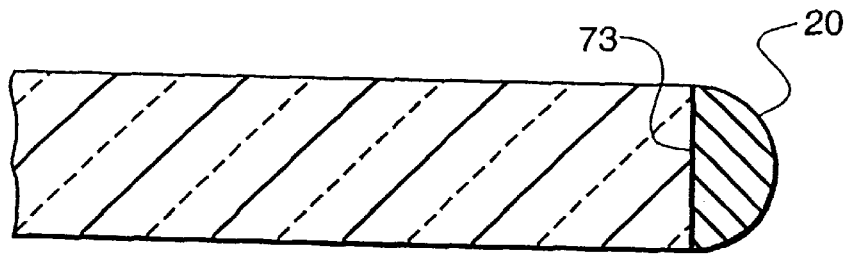

The coating (20) of FIG. 7 covers the gasket edge from the corner to the corner of the edge (73), the coating being thus, coextensive with the edge, (thus going from one corner plane to the other). Preferred embodiments have the coating on the coated edge protruding past the corner planes (such as FIG. 9 where the coating (26) goes past planes (37) and (38).

Figure 6:
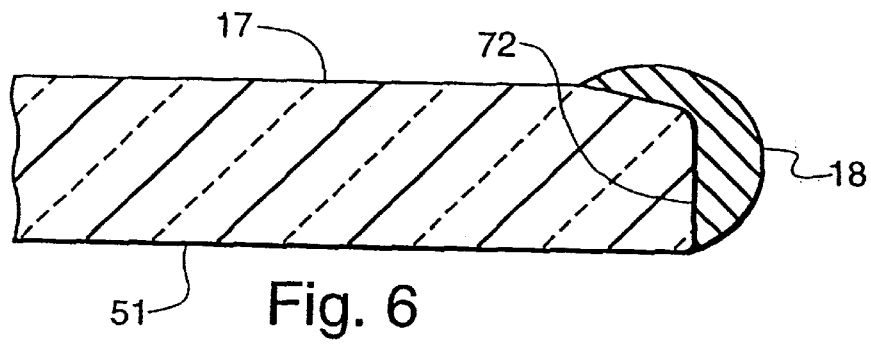
Figure 8:
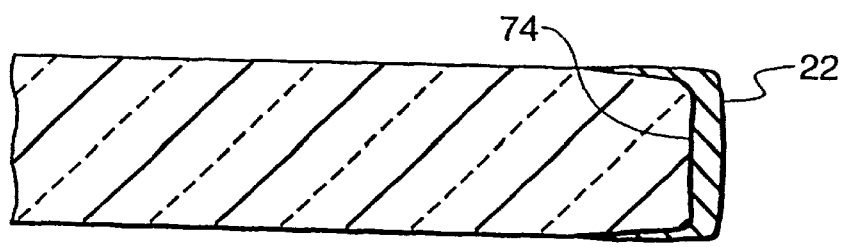

The thickness of coating (18) of FIG. 6 and of coating (22) of FIG. 8 is also wider than the vertical edge (72) and (74) of the gaskets and where the coating abuts the gasket. In addition to this, in FIG. 6, the slight tapering of one horizontal face of the gasket (17) narrows one vertical edge slightly, and allows coating (18) to lap up onto the face (17) of the gasket. In FIG. 8, both horizontal faces of the gasket taper next to the edge of the gasket and the edge coating covers the gasket slightly on each horizontal face. The tapering of the horizontal face of the gasket abutting the aperture is a preferred, optional embodiment. A coating can also be put on the gasket face abutting the vertical edge without the tapering of the gasket faces next to the edge. A good to excellent and even total seal can be achieved without tapering the faces of the gasket on the horizontal face.

Tapering of the gasket thickness on the horizontal face near the coated vertical edge (as shown by FIG. 6 and FIG. 8) is an optional, preferred embodiment. Another preferred embodiment is the lapping of the coating (coating A) over the corner of the edge of the gasket onto the face (where it is then referred to as coating B). The coating can be lapped over the corner of the vertical edge of one or both sides of the gasket (whether or not the thickness at the horizontal face near the edge is tapered)(shown in FIGS. 6 and 8).

For example such tapering of the gasket thickness can be done at a distance of from about ¼ inches away from the vertical edge up to the vertical edge. It can also be noted that coating (18) of FIG. 6 is slightly wider than the gasket thickness where the coating abuts the vertical edge of the gasket. Having a coating which is wider than the gasket where the coating abuts the vertical edge of the gasket is another preferred embodiment. In another preferred embodiment, the coating will continue to increase in thickness proceeding away from the coated vertical edge (and into the aperture). One variation of this embodiment is shown in FIG. 5.

Figure 5:
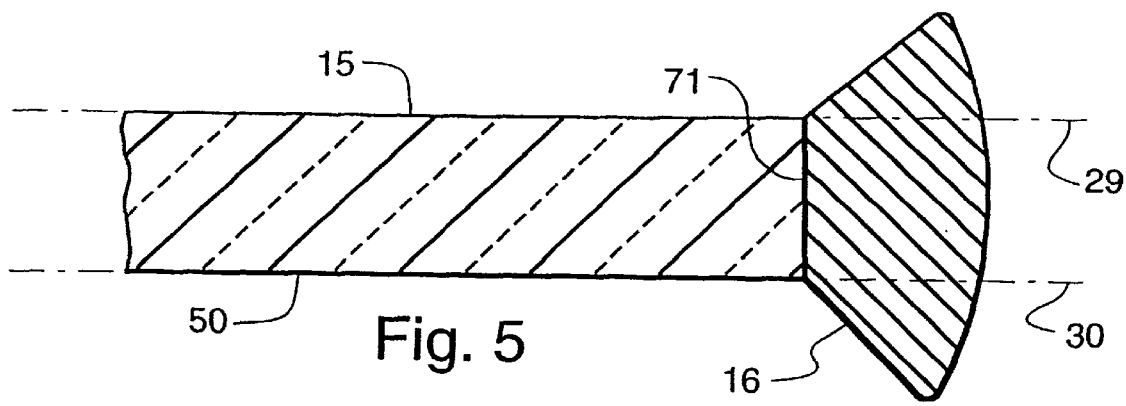
FIGS. 5–12 show configurations of several edge coatings.
Figure 9:
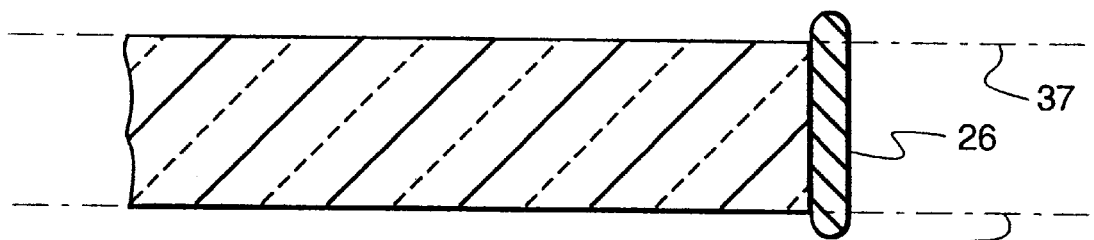

FIGS. 5–12 show embodiments with a gasket aperture edge coated by a coating composition. FIGS. 5 and 9 show alternates to achieve extremely effective sealing by the gasket, and at the same time giving very good compression failure resistance. Two main points of leakage where the sealing ability of a gasket fails is 1) through the gasket (especially through the gasket pores in the vertical edge) across the vertical edge of the gasket and 2) across the gasket surface between the horizontal surface of the gasket and the flange. FIGS. 5, 6, 8 and 9 show preferred embodiments of the gasket which reduces leakage at each of these two points. FIGS. 5 and 9 with the wider coatings give an even better seal than FIG. 8.

Figure 10:
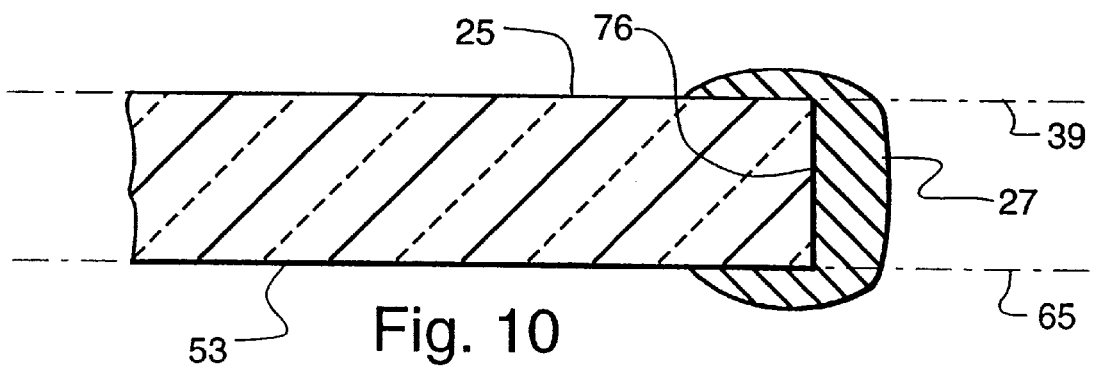

FIG. 10 shows an aperture coating (27) on edge (76) which is between face (25) and (53). The coating is suitable and effective to give an adequate seal. More preferred embodiments, however, are shown in FIGS. 5 and 9. More preferred embodiments of the edge coating have a coating that is wider than the gasket edge and thus protrudes beyond the edge, going past facial, corner planes (37) and (38) of FIG. 9 and planes (29) and (30) of FIG. 5. More preferably, the coating can protrude (having a width greater than the width of the gasket edge) going at least about 1 mil past the facial plane and any facial coating thickness, even more preferably it protrudes (in a direction parallel to the gasket edge), at least about 5 mils, and most preferably it protrudes at least about 10 mils past the facial plane, and past any facial coating thickness. In suitable embodiments of the wide edge-coating, it is sufficient that the edge coating protrudes past at least one corner plane.

FIG. 7 shows an edge coated gasket with a coated aperture edge (73) where the edge coating (20), adjacent to and abutting the vertical edge of the gasket, has substantially the same thickness as the gasket.

Figure 11:
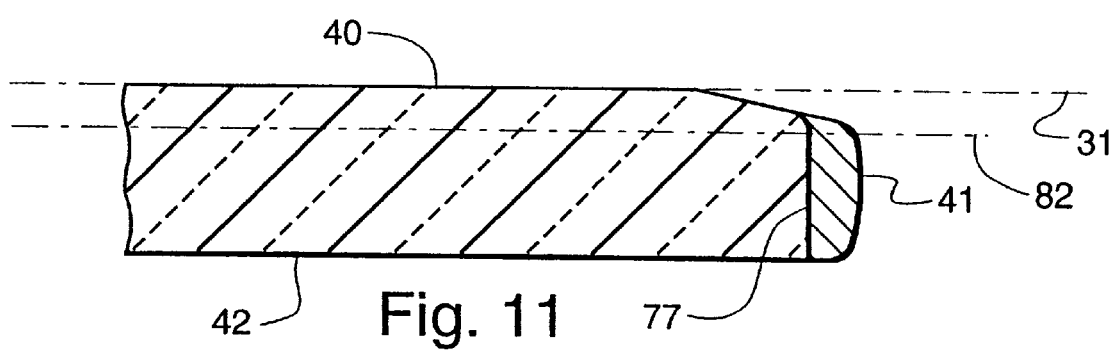

FIG. 11 shows a gasket with a tapered face (40). Aperture edge (77) is coated by coating (41). The coating (41) covers the edge from one corner past the other corner (covering the gasket sheet edge from one corner where corner plane of face (42) goes through the gasket and past corner plane (82) to lap slightly onto face (40) of the gasket). Facial plane (31) is seen in the figure.

Figure 12:
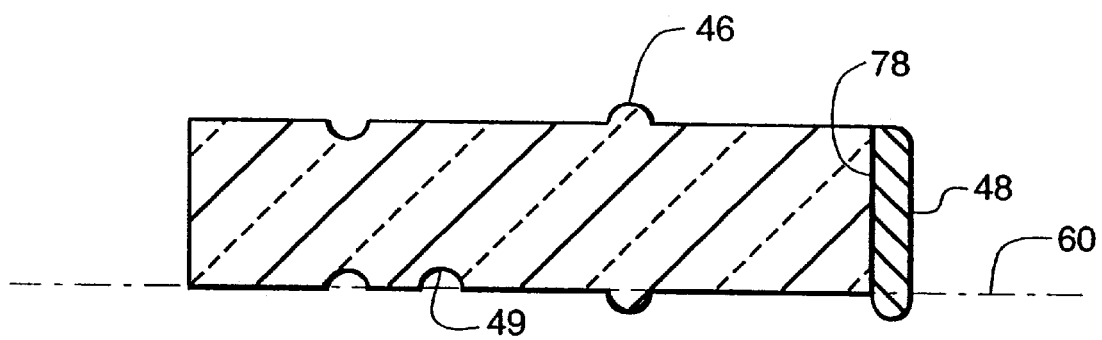

FIG. 12 shows a gasket with aperture edge (78) coated by coating (48) which protrudes past facial, corner plane (60) (the plane is both a facial plane and a corner plane). The gasket has embossed areas such as (49) and beading such as (46).

DETAILED DESCRIPTION

Any porous material can take advantage of the present invention. Any soft gasket material which has at least one edge can also take advantage of the present invention. A soft gasket material is a gasket sheet material which typically is compressible, flexible and porous. Many types of soft gasket materials comprise fiber and a binder, other types of soft gasket materials comprise a binder and a filler, such as, for example, rubber and cork; preferred soft gasket materials comprise fiber, binder, and filler. Soft gasket materials have pores along the vertical edges of the aperture. These pores are detrimental to the sealing ability of the gasket.

A soft gasket material can be given an edge seal on an aperture exposed to fluids and obtain a seal against the fluid. Surprisingly, there is no need to change the composition of the sheet material for any significant improvement in sealing ability. The edge coating delivers the seal. Surprisingly, in many cases there is no need for significant sealing ability in the base sheet. Furthermore, a base sheet with the edge seal can accommodate many different types of flanges without any change being made to the base sheet.

Gaskets which are particularly suited to the present invention are soft gasket materials having apertures that were cut in the material. The cut edges of soft gasket materials are more typically more porous since the material was cut to expose the open space inside the sheet. Generally, the cut edge is more porous than the face of the gasket. It is highly preferred to put a coating seal on an aperture edge which must seal against fluids. Since the fluid generally contacts the gasket first at the aperture edge, coating this edge is referred to as a primary seal. It may also be desirable to put a coating (Coating C) on the outer edge of the gasket, either instead of or in addition to the coating at the aperture. The outer edge marks the outer perimeter or circumference of the gasket. Coating C, on the outer edge of the gasket, however, is not as advantageous as a coating at the aperture. On the perimeter of the gasket the coating will only form a secondary seal against fluids, keeping them from going past the gasket.

The primary seal, at the aperture edge (coating A) is preferred.

Preferred gaskets that can use the present edge seal with improved compression failure resistance are gaskets for intake manifolds; oil pan gaskets (sealing against oil); covering gaskets such as valve coverings (which seal against oil) and axle coverings (which seal against gear lubricant); water pump gaskets which seal against water and antifreeze; and compressor gasketing applications which are frequently exposed to refrigerants such as freon; gas meter gaskets, exposed to gases; and industrial flanges, exposed to steam and chemicals. The type of coating for each application is important to achieve preferred embodiments since some particular types of coatings will hold the particular fluid better than others (some coatings have chemical interaction with the fluid). The wide edge sealing design (having the coating protruding past at least one corner which lies between the face and the edge) has been found to be surprisingly suited for sealing oil pans of diesel engines, for sealing oil coolers in diesel engines, and for sealing vacuum in intake manifolds against air and fuel mixtures. Chloroprene polymer or acrylonitrile are the preferred coatings for embodiments with exposure to the refrigerants; acrylic or acrylonitrile are the preferred coatings for embodiments with exposure to oil.

A preferred gasket has planar faces, although suitable gaskets for the present invention include gaskets having such features as embossing on one or both faces, or tapering of the gaskets at the edges of one or both faces. The gaskets, however, have opposed, planes, herein referred to as "facial planes" and "corner planes". The corner planes go through a corner between a face and an edge. The planes extend infinitely and the facial planes go through substantially flat portions of each face. The edge is substantially perpendicular to these facial planes. The corner plane is either the same as the facial plane or is parallel to it.

Compression failure resistance is the ability of a gasket structure to withstand pressure without deforming the gasket to the point of failure. The crush test (shown in example 1) is an industry accepted measurement of compression failure resistance. The degree of compression failure resistance a gasket must have is set by the load that it will experience in a particular application or in the particular flange that it is used in.

In one embodiment of the present invention the gasket sheet has a coating which penetrates the pores along the vertical edge of the aperture which is perpendicular to the opposed planes of the two planar faces of the gasket. The penetration of the coating material into the pores provides the gasket sheet material with a better sealing ability. The gasket will have uncoated surfaces in an amount effective to give the gasket better compression failure resistance than the gasket would have if at least a portion of the uncoated surface was coated with a coating for sealing ability. Suitably, about 50% or less of each face is coated with a sealing coating, the gasket's compression failure resistance is optimized and good compression failure resistance is obtained. For even better compression failure resistance no greater than about 30% of each gasket face can be coated by a coating for sealing the gasket. The best compression failure resistance is obtained where there is substantially no coating on either face of the gasket.

When the gasket sheet material comprises fiber and binder, in most cases, a filler is also present. The gasket sheet should have at least 1% by wt. of the binder and at least 5% by wt. of the fiber. Filler can also be added at a minimum level of about 1%. Suitable ranges are from about 3 to about 40% by wt. of the binder, from about 5 to about 70% by wt. of the fiber, and from about 1 to about 92% by wt. of the filler.

At least one edge, which is around an aperture and substantially perpendicular to the substantially opposed faces is given a coating (coating A) for sealing ability. Where the edge is coated, the coating covers the edge from the corner of one face totally across the gasket at least up to the corner of the other face. It is important to cover the edge from one side of the edge to the other side of the edge where the coating is a barrier formed on the edge to seal the pores and/or penetrate the pores.

Coating the gasket aperture's edge can be done in any film-forming manner such as, for example, dipping or melting (while protecting the gasket portions not to be coated) or painting. This coating on the edge provides sealing ability.

In one embodiment a coating can be put on an aperture edge by placing a plurality of gasket sheets together so that a cavity is formed from the apertures of the plurality of gasket sheets, and then contacting the edges of the aperture on each gasket sheet with a coating material so that the edges become coated in an amount effective to achieve a substantial sealing of the gasket along the edge of the aperture where the edge is coated. The gaskets can be aligned and placed together so that they abut, or, in some of these embodiments it may be desired to place other sheets in between two or more of the gasket sheets. Such sheets in between the gaskets would be "spacers" to separate the gaskets from each other. The spacer sheets will also have apertures, but the apertures can be wider, smaller or the same size as the apertures of the gaskets. When the spacer has a wider aperture than the gasket, a portion of the gasket sheet face is exposed, and the coating material can contact and coat the face where it is exposed around the aperture. When the spacer aperture is smaller than the aperture of the gasket sheet, then gasket sheets will be separated from each other and less coating will overlap the corner of the edge onto the face of the sheet.

In other embodiments, some of the aperture's edge can be protected from the coating material so that only a portion of each edge of the aperture on each gasket sheet are contacted with the coating material. This may be desired where the aperture edge is close to a bolt area. Where the aperture edge is within, for example, 3.5 cm. of a bolt it may be desired to preserve even more compression resistance by not adding coating even to the edge. The extra pressure added by the bolt will be effective to give some added sealing ability to the gasket, so that it may not be necessary or desired to completely coat the apertures' edge. To achieve such embodiments a spacer sheet is preferably configured to cover the portion of the edge which is not to be coated. To seal well against fluids going through the gasket, however, the method for coating the aperture's edge should insure that the edge portion to be coated should be contacted with the coating material across the entire thickness of the gasket's edge, from one corner abutting one face to the other corner abutting the other face.

Any vertical edge between the opposed, parallel, planar faces of a gasket sheet material can be given a coating, including the edge which forms the outer perimeter of the gasket. The coating can be organic, inorganic, or a hybrid of both. When the vertical edge is one which encounters fluids during use, however, a polymer coating is particularly useful and preferred. In such cases, preferably, the entire edge is coated to obtain the best sealing ability possible from the coating. In such a case the coating on the aperture edge is herein referred to as a "primary seal". The coating on the aperture's edge is particularly desirable when the gasket must seal against fluids. The edge coating in such a case prevents penetration of the fluid into the sheet. optionally, a coating strip (coating B) can be put on one or both faces completely around an aperture, so that it abuts the edge perpendicular to each face and also abuts or even joins with the coating on the aperture's edge (coating A). The coating strip can be beneficially used where the flanges do not fit together tightly to form a fitted seal against fluids. If, for example, a flange is warped even slightly so that it curves away from a planar (facial) surface, the coating strip can be useful in providing a better seal against fluid leakages. For such applications, the coating strip will, preferably be put around the aperture where fluids are encountered in use. Preferably, coating A is wider than the gasket and coating B combined, so that coating A protrudes at least about 1 mil beyond coating B on at least one face (coating A, thus forming a lip above coating B); more preferably it protrudes at least about 5 mils, and most preferably it protrudes at least about 10 mils (1 mil is $1/1000$ of an inch). A preferred range for coating A protruding beyond coating B is from about 5 to about 80 mils and more preferably from about 10 to about 80 mils.

Features where coating A extends past the gasket face at the corner of the edge (thus protruding past the corner plane), or where coating A extends past coating B can be referred to as a "lip formation" or a "lip". Such features form a barrier or dam against fluids. Lips are, for example, shown in FIGS. 5, 9, and 12.

Optionally, each gasket face can be given a release coating (to make the gasket easier to remove from the flange after use) which do not substantially affect compression failure resistance. A release coating is typically less than 1 mil in thickness. For the best performance the release coating should not substantially penetrate the gasket structure. The high degree of compression failure which is caused by sealing coatings is, thus, not typically found with release coatings. Furthermore, a sealing coating frequently penetrates the gasket structure. The present invention provides compression failure resistance and sealing ability to the gaskets. Coatings on the gasket face which enhance or provide sealing performance of the gasket will detrimentally effect the compression failure resistance and these must be limited. Such coatings are generally done with a heavier coating material than the release coatings.

Figure 1:
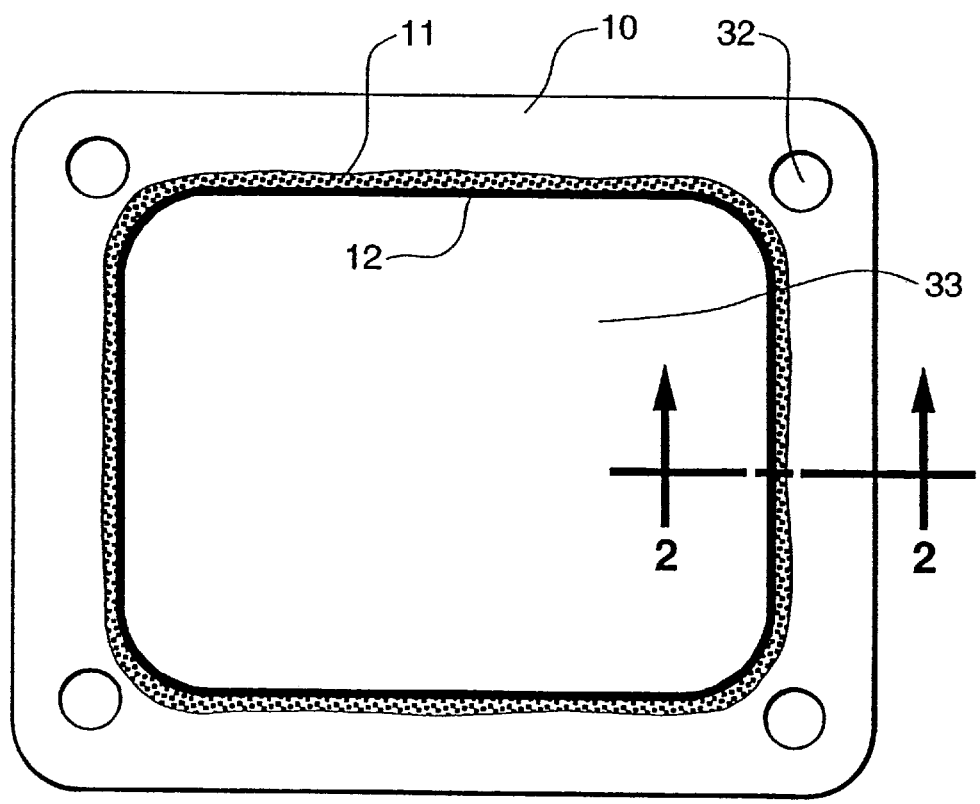
FIG. 1 shows a soft gasket material (10) which has been cut for a flange. The gasket has a large aperture (33) and four smaller bolt holes (32). The gasket has a strip of coating (11) around the aperture on the face of the gasket. The gasket also has coating (12) on the vertical edge around the aperture. The coating (12) covers the entire vertical edge and is made of a different coating material than the strip of coating (11).
Figure 2:
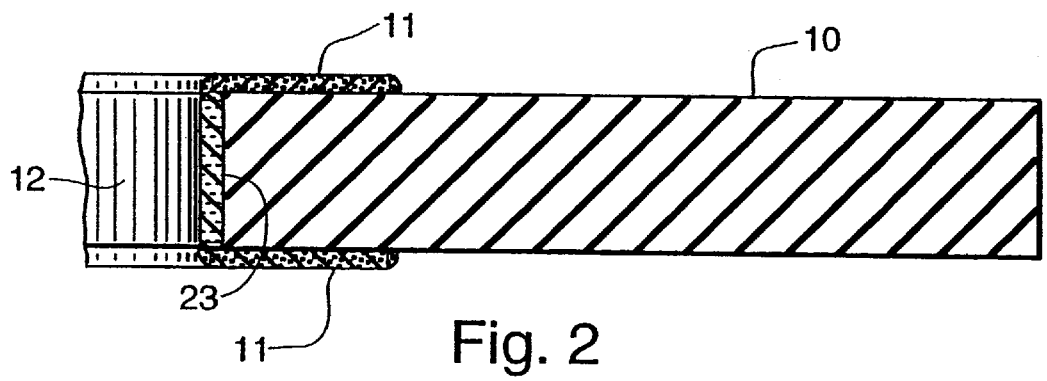
FIG. 2 gives another view of the gasket sheet shown in FIG. 1. The soft gasket material (10) is seen with a coating strip (11) on each face around and abutting the aperture. On the edge which is perpendicular to each face and is around the aperture is coating (12). A vertical edge (23) of the gasket material is also seen.
Figure 3:
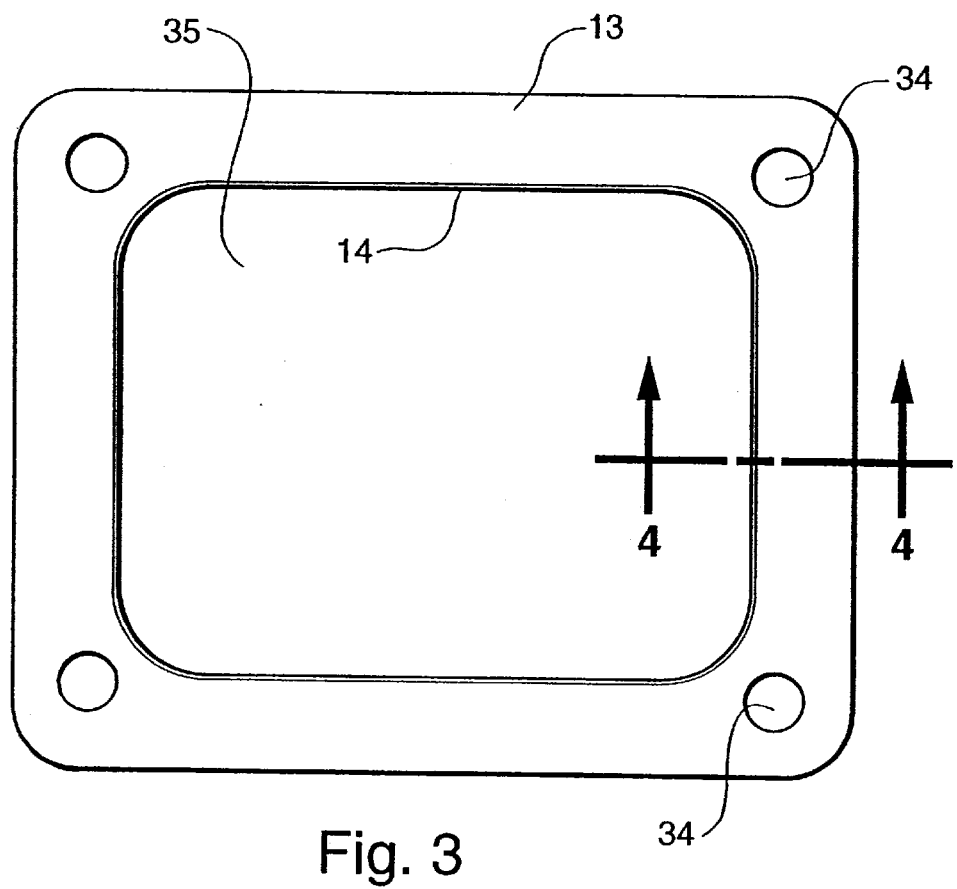
FIG. 3 shows a soft gasket material (13) which has been cut for a flange. The gasket has an aperture (35) and four smaller bolt holes (34). The gasket also has coating (14) which covers the entire vertical edge around the aperture.
Figure 4:
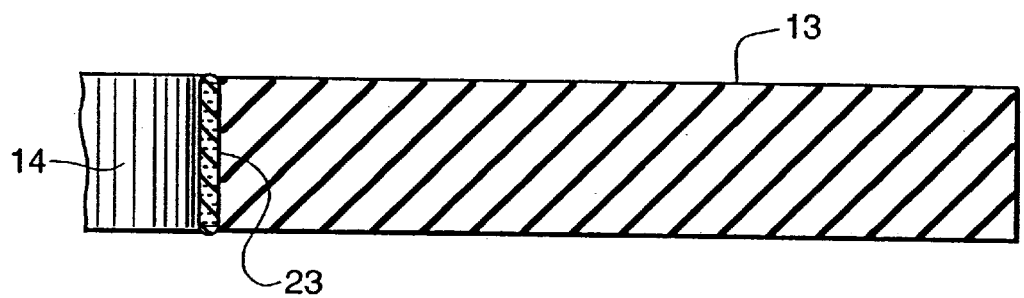
FIG. 4 gives another view of the gasket sheet shown in FIG. 3. The soft gasket material (13) is seen with a coating (14) on the edge (23) which is perpendicular to each face and is around the aperture.

In other embodiments, the edge coating on the vertical edge of the gasket can be lapped over onto either face of the gasket (such as, for example, is shown by FIG. 6 and FIG. 8). Alternatively, another coating can be added to the face abutting the edge as is shown by FIG. 2. In order to obtain the compression failure resistance, this overlap and the added coating should be limited in both thickness and in width. Preferably, the sealing coating can, however, extend up to about 1.5 cm on the face of the gasket, as long as the coating of the gasket face is limited to preserve compression failure resistance, more preferably not covering more than about 50% of the facial surfaces. More preferably, it extends a maximum of about 5 millimeters (mm) across the face of the gasket. Most preferably for even better compression failure resistance, the overlap of edge coating (coating A) onto the horizontal face of the gasket is a maximum of about 1 mm. The wider this sealing coating on the face of the gasket, the greater the detrimental effect on the gasket's resistance to failure under pressure. Thus, the thinner the strip of coating the better will be the compression failure resistance.

The sealing coating which is allowed to coat the gasket face next to the vertical edge of the gasket should preferably be limited in thickness in order to preserve the gasket's resistance to failure under pressure. Preferably, the coating abutting the edge on the face of the gasket should be 11 mils or less in thickness. More preferably the coating will be a maximum of 7 mils in thickness even more preferably it will be a maximum of about 4 mils in thickness and most preferably it will be about 2.5 mils in thickness or less. The thicker the edge coating (adjacent to and abutting the coated, vertical edge of the gasket) the lower the pressure at which the compression failure of the gasket will occur.

Practicality is the factor limiting the thickness of the coating directly on the vertical edge, both in the direction parallel to the vertical edge and perpendicular to the vertical edge. Very small thicknesses, however, have been found to be effective. Since a relatively thin coating is effective it will be cost effective to limit the thickness and width of the coating on the vertical edge of the gasket aperture. The coating on the gasket aperture's edge where the gasket is to be sealed should coat the entire edge from one side to the other in order to complete the seal.

The gaskets have planar faces with opposed, facial planes; the apertures edge is perpendicular to these planes. In preferred embodiments the coating on the aperture's edge extends beyond at least one of these opposed planes to give a better sealing ability. Preferably the coating at the edge of the aperture, going in a direction parallel to the edge will protrude a distance of at least 1 mil past either an opposed, facial plane of at least one face or suitably it can protrude at least 1 mil past a corner plane (as shown in FIG. 11) of the gasket in order to give a better seal. A suitable range for the distance which the coating will extend beyond at least one opposed facial plane of the gasket's face (as shown by FIG. 5 and 6) or, alternatively, past the corner plane is from about 1 to about 80 mils. More preferably it protrudes on each side of the gasket. A more preferred range for the coating to protrude past at least one corner plane or, alternatively past at least one facial plane is from about 5 to about 80 mils, and even more preferably it protrudes past a corner or, alternatively, past a facial plane a distance of from about 10 to about 80 mils. More preferably, the coating on the edge in the direction parallel to the vertical edge extends (or protrudes) a minimum of about 5 mils beyond the edge and past the plane of the face or, alternatively, past the corner plane at the surface of the vertical edge to give an even better seal; an even more preferred minimum is at least about 15 mils past either the corner plane, or alternatively, past the facial plane. Protruding coatings such as these (note FIG. 5 and 6) will improve sealing ability. The coating can protrude past the plane of the gaskets' face on one or both sides of the gasket or past the corner on one or both sides of the edge. Preferably it extends past the plane on both sides.

The coating thickness in the direction perpendicular to the vertical edge is not critical. The coating preferably is a minimum of at least about 0.1 mm thick and preferably can be up to about 2 mm thick. The coating on the vertical edge is intended to seal the gasket; thus the coating should have a minimum thickness needed to seal the gasket. Suitably the sealing coating on the vertical edge should be at least about 1 mil in thickness (extending in a direction perpendicular to the vertical edge).

In other embodiments, the edge coating (coating A) is put on the edges to be sealed, such as in FIG. 7 (especially against fluids), and the rest of the gasket is left entirely uncoated, except for an optional release coating such as a flouropolymer containing polymer coating. Thus, in such embodiments, no coating strip is added as a border around the aperture and abutting the coated vertical edge. The edge coated gasket (coating A) is preferred for gasket applications where the gasket must withstand high flange pressures, for example, in excess of about 10,000 PSI, or in the range of from about 10,000 to about 30,000 PSI where compression failure resistance is particularly important. This limitation is significant since even coating (B) of a border strip around the aperture circumference has been found to detrimentally effect the gasket performance, especially when the pressures are in excess of about 10,000 PSI (note gasket sample C of Example 1). Thus, when a gasket does have a coating strip on one or both faces, the gasket can preferably be used at pressures in the range of from about 3,000 to about 15,000 PSI, and is even more preferred for use at pressures up to about 15,000 PSI. Particular types of gaskets which are highly suited to be edge-sealed by coating the edge of the gasketing apertures includes gaskets for compressors, for front covers to block joints on diesel and automotive engines, pipe flanges and pressure vessels. Such gaskets are highly loaded, and preferably, such gaskets are edge coated, but not substantially coated on the facial surfaces for sealing ability.

Gaskets having optimized compression failure resistance can preferably operate at pressures in the range of from about 20 or preferably from about 1000 to about 30,000 PSI. Compression failure resistance will be better where less coating is used. Gaskets with up to about 50% of the faces coated can operate preferably in the range of from about 3,000 to about 15,000 PSI. The compression failure resistance will be better in a gasket having no coating or less coating than the same gasket if it had at least a portion of the facial surface or a larger portion of the facial surface coated.

In another embodiment coating A can overlap the corner of the edge of the gasket and overlap onto either or both of the gasket's faces. The overlap onto the face of the gasket can range from just a trace, less than 1 mil or can extend into the formation of coating B. When it is desired to have Coating A extend onto the face of the gasket and become Coating B, suitably Coating A extends at least about 5 mils onto the face of the gasket. More preferably the overlap onto the face extends onto the face a distance of 10 mils or more, although it can preferably be extended to form coating B up to a distance of 1.5 cm while not covering more than about 50% of the gasket surfaces.

In other embodiments, the gasket's outer edge can be given a coating (coating C). In such a case, the gasket material's outer edge is perpendicular to the facial surfaces and is present around the gasket as a circumference. Coating C is thus, on the edge at the perimeter of the gasket sheet. This outer edge abuts all outer corners of each facial surface. Coating C preferably covers the entire outer edge. Such a coating, however, is only a secondary seal against the fluids which primarily come through the gasket or over the gasket past the aperture's edge. It is preferred to coat the aperture's edge instead of or in addition to coating the outer edge.

A coating is any material which puts on a coat. This includes powders, filled polymers, and 100% solid fluids. Inorganic materials which can be used to coat the edge (forming any of coating A, B and/or C) include chemically delaminated mica and vermiculite coatings. Preferred coatings are polymers (including organic and inorganic hybrids and inorganic/organic hybrids) as well as filled polymers. The polymer coatings can be used to form either coating A, coating B, or coating C. Suitably the polymer coating materials are coatings selected from the group consisting of acrylic, acrylonitrile, acrylonitrile butadiene rubber (NBR), fluoro polymers, hydrogenated NBR, styrene butadiene polymer, fluoroelastomer polymer, acrylic-acrylonitrile polymers, carboxylated acrylonitrile polymer, carboxylated styrene butadiene polymer, polyvinylidene chloride, chloroprene rubber polymer, ethylene propylene rubber polymer, ethylene/vinyl acetate polymer, epoxy, fluorosilicones, polyurethane, and silicone rubber coatings (both UV curable and room temperature curable) and mixtures thereof can be used. A preferred polymer coating is a filled polymer having silica, carbon black and/or clay filler. Any latex may be used. Any elastomer can be used. Also suitable as a coating are polymer powders which are heated to melt them on to the surface of the gasket. In fact, any powder which can be fused can be used to coat and seal the edge. Polymer coatings A, B, and C can be different polymer coatings or they can be the same polymer coating.

Since coating the faces of the soft gasket for sealing ability is limited, the performance of the gasket under high pressure conditions (a minimum of at least about 3,000 PSI) is maximized. At the same time, the vertical edge of the gasket aperture has a coat to provide the gasket with an adequate sealing ability.

To make the gaskets of the present invention, the edge of the gasket can be coated in any convenient manner. This can be done either before or after coating B which may optionally be added to one or both faces of the gasket.

The present invention may be better understood from the examples which follow. These examples, however, are included to illustrate the invention and not to limit it. All parts and percentages are by weight unless otherwise indicated.

EXAMPLES

Example 1

A. Crush Test—ASTM F1574-95

Identical annular gaskets were cut from a cellulose based paper gasket sheet material.

Each gasket formed a circle and had the following measurements: inner diameter 0.515 inches (distance from the center to the inner edge of the ring), outer diameter 0.950 inches, ring width 0.2175 inches.

The gasket rings under A which are indicated in Table 1 below, as the control, were left completely uncoated; under B, each gasket ring sample had the inner vertical edge (0.515 inches from the center) coated with NBR latex; for the gasket samples under C, the gasket ring had both the inner vertical edge coated with the NBR latex, and having a strip of room temperature vulcanizable silicone coating (from Loctite Corp.) coated on each face of the gasket. This strip of coating was put onto each face so that the coating strip touched the coating on the vertical edge. The coating strip was 4 mils thick and ⅛ inch wide. The gasket samples under D had a coating of the room temperature vulcanizable silicone coating (from Loctite Corp.) over the entire surface of the gasket.

To test the compression strength under elevated temperatures, each gasket ring was put under a controlled amount of pressure at 300° F under uniform load conditions and the deformation of the sample was measured as a percent change (increase) in area. This is a common test of gasketing, known as the crush test, and it can be found described under ASTM: F1574-95.

The results of this comparison is given in Table 1 below. In the table the values under each pressure level for each gasketing type is given in terms of percent change in area. It is considered a failure when the value is greater than 10. The higher the number, the worse is the performance and the more undesirable the gasketing.

TABLE 1

| Pressure (PSI) | A | B | C | D |
|---|---|---|---|---|
| 2500 | — | — | — | 2 |
| 3250 | — | — | — | 21 |
| 5000 | 1 | 1 | 1 | 60 |
| 10,000 | 2 | 1 | 9 | — |
| 15,000 | 2 | 4 | 35 | — |

The above data shows that the coated gasketing (D) cannot withstand the pressures of even 3250 PSI without distorting to an undesirable degree. The performance of the uncoated gasket (under A) and of the gasket which is edge coated (under B) and edge coated with a strip of coating around the aperture (under C) shows much better performance and an ability to withstand even higher pressures of 15,000 PSI without significant distortion (less than 10% change in area). Gaskets C having both the edge coating and the strip of coating on the surface from this test is seen to be preferred for flange pressures up to 10,000 PSI.

B. Sealing Ability Test

Gaskets were cut from a cellulose based paper gasket sheet material. The gaskets tested were gasket A (uncoated), gasket B which had the inner vertical edge of the aperture coated with NBR latex; for the gasket samples under C the gasket ring had both the inner vertical edge of the aperture coated with the NBR latex, and having a strip of room temperature vulcanizable silicone coating (from Loctite Corp.) coated on each face of the gasket (the strip on each gasket face was 3/16 inch wide).

These gasket samples were put into a cylinder which could be pressurized with nitrogen. For this test the nitrogen pressure in the cylinder was brought up to 14 sounds per square inch (PSI), and the number of minutes which elapsed while the pressure decayed to 13 PSI was measured. This test was done on a smooth flange, measuring 18 Ra (Ra is the average roughness value and this is measured in microinches; MS indicates micro-inches) and the test was also done on a rough flange, measuring 250 Ra. The results are given in Table 2 below.

TABLE 2

| Gasket | Time (min) | Flange pressure | Flange Roughness |
|---|---|---|---|
| A | 1.5 | 2100 PSI | 18 Ra |
| A | 1.0 | 2100 PSI | 250 Ra |
| B | 11.0 | 2100 PSI | 18 Ra |
| B | 11.0 | 2100 PSI | 250 Ra |
| C | Total Seal | 300 PSI | 18 Ra |
| C | Total Seal | 300 PSI | 250 Ra |

Significantly, where the gasket was both edge sealed at the vertical edge of the aperture, and also given a coating strip on each face, the gasket could give a perfect seal even at a flange pressure as low as 300 PSI on both the smooth and the rough flange. In applications where sealing ability is important, therefore, the more preferred embodiment of the present invention has both an edge seal coating and a coating strip on at least one gasket face around the aperture, to cover up to about 50% of the gasket face. Even more preferably up to about 30% of each gasket face can be covered.

Example 2

The effectiveness of the coating on the vertical edge of the gasketing to provide a good sealing ability for the gasket is demonstrated by the data of this example.

Identical gaskets were obtained from the same gasket sheet material. Both gaskets had two parallel faces with a vertical edge around a circular aperture. Gasket A was allowed to remain entirely uncoated. Gasket B, however, was given a coating of NBR latex (from Reichhold) on the gasket's vertical edge which formed the aperture. For this example, only the vertical edge was coated.

The sealing ability of each of these gaskets were shown in a high pressure sealing ability test. According to this test, a gasket is held in place to seal off a cylinder of nitrogen. The nitrogen is pressurized to 225 PSI (pounds per square inch). The flange which the gasket seals is put under pressures at recorded levels. The cylinder is permitted to sit for one hour, and the gas pressure left at the end of the hour is noted. The best seal will hold the highest gas pressure.

TABLE 3

| Gasket | Flange pressure | |
|---|---|---|
| | 500 | 1000 |
| A (uncoated) | gross leak | gross leak |
| B (coated) | 218 PSI | 223 PSI |

Gasket A, with no coating, had such a gross leak that it was impossible to note what the gas pressure was after the hour had elapsed. The above data also demonstrates that by coating the vertical edge around the aperture's circumference, that a gasket can be given a substantial sealing ability. It is seen that even at the lower flange pressure of 500, the edge-coated gasket held the gas pressure at 218 PSI after one hour.

Example 3

The gasket sheet material used in Example 2 was used to provide gasket rings which were subjected to the crush test described in Example 1. Gasket A, the control, was left uncoated and was not edge sealed. Gasket B was given a coating on the vertical edge which formed the aperture in the center of the gasket ring. Each gasket ring went up to 5,000 PSI of pressure before deformation was seen. The results in Table 3 below show the percent change in area under each pressure level.

TABLE 4

| Gasket | 5,000 PSI | 10,000 PSI | 15,000 PSI |
|---|---|---|---|
| A (uncoated) | 1 | 10 | 16 |
| B (edge coated) | 2 | 9 | 16 |

Example 4

This test simulates a warped flange. The test shows that gasket C having both the vertical edge sealed and the strip of coating on each gasket face around the aperture still gives good performance.

For the test, the flange used had a concave surface. The concavity, spread over the width of the flange, was 36 millimeters long, and 3 mils deep at the center point. The cylinder is fitted with a gasket, and given 17.5 Newton-meter of torque on each of the two bolts. Oil fills the cylinder and 5 PSI of air pressure is put behind the oil. The gasket is considered a failure if the oil penetrates ⅔ of the way across the width of the gasket after 46 hours.

For the uncoated gasket (Gasket A), there was a failure. The oil had penetrated all the way through to the outside edge of the gasket after only five hours. For Gasket C (having the coated vertical edge with strips of coating on each face), there was no penetration of oil into the gasket after 46 hours.

Example 5

An annular gasket identical to those used in Example 1 was cut from the same gasketing material as was used for Example 1. An acrylic latex (from BASF) was used to coat the gasket ring sample on the inner vertical edge of the ring aperture. The coating was put onto the vertical edge so that in the direction going from one side of the vertical edge to the other, parallel to the vertical edge of the gasket, the coating was thicker than the gasket thickness. Furthermore, the coating gradually increased in thickness width (in a direction parallel to the gasket edge) as the distance from the vertical edge increased. The coating on the edge of the gasket, in fact, resembled FIG. 5. The distance from the center of the vertical edge of the gasket to the end of the coating was measured at about 0.9 mm. The gasket thickness (and the thickness of the vertical edge) was approximately 32 mils. Measuring the coating at its widest point, the coating measured approximately 27 mils past each corner of the vertical edge where the edge joined the face of the gasket. Otherwise stated, since the facial planes of each face of the gasket went through the corner of each cut, vertical edge, (the corner plane and the facial plane were the same plane) the coating, at its widest point was also approximately 27 mils past the plane on each side of the gasket (measuring between the plane and the tip of the coating).

The gasket was tested in a cylinder which could be pressurized with nitrogen (as described in Example 1). The nitrogen pressure in the cylinder was brought up to 14 PSI, and the number of minutes which elapsed while the pressure decayed to 13 PSI was measured. This test was done on a smooth flange measuring 18 Ra. The control of this test is the result reported for gasket A of Example 1, which held the pressure only for 1.5 minutes and required a flange pressure of 2100 PSI. The edge sealed gasket of this example delivered a total seal (pressure never decreased in the cylinder), and the flange pressure of the cylinder on the gasket was only 300 PSI.

A perfect seal was, therefore, achieved by the particular edge coating of this example. In applications where both sealing ability and compression failure resistance are important, therefore, it will be advantageous to use an edge coating where the coating is wider than the vertical edge of the gasket (going in a direction parallel to the vertical edge).

Example 6

An annular gasket identical to those used in Example 1 was cut from the same gasketing material as was used for Example 1. A silicone coating was used to coat the gasket ring sample on the inner vertical edge of the ring aperture. The coating was put onto the vertical edge so that in a direction parallel to the vertical edge of the gasket the coating was thicker than the gasket thickness next to the vertical edge of the gasket and the coating overlapped on one horizontal face of the gasket (as shown by FIG. 6). From the vertical edge of the gasket going through the coating in a direction perpendicular to the vertical edge, the coating was measured to be approximately 0.4 mm at the center of the vertical edge.

The gasket was tested in a cylinder which could be pressurized with nitrogen (as described in Example 1). The nitrogen pressure in the cylinder was brought up to 14 PSI, and if the flange did not have a total seal at a given flange pressure, the number of minutes which elapsed while the pressure decayed to 13 PSI was measured. The lower the flange pressure at which a total seal is achieved, the better the results, and if a total seal cannot be achieved at any flange pressure, the longer the pressure is held, the better the result. This test was done on a smooth flange measuring 18 Ra. The control of this test is the result reported for gasket A of Example 1, which held the pressure only for 1.5 minutes and required a flange pressure of 2100 PSI. The edge sealed gasket of this example delivered a total seal (pressure never decreased in the cylinder) at the flange pressure of 2100 PSI.

Example 7

An annular gasket identical to those used in Example 1 was cut from the same gasketing material as was used for Example 1. A silicone coating was used to coat the gasket ring sample on the inner vertical edge of the ring aperture. The coating was put onto the vertical edge so that in a direction parallel to the vertical edge of the gasket the coating was thicker than the gasket thickness next to the vertical edge of the gasket, and the coating overlapped on each horizontal face of the gasket (as shown by FIG. 8). The coating extended onto each horizontal face of the gasket for a distance which was measured at approximately 0.38 mm.

The gasket was tested in a cylinder which could be pressurized with nitrogen (as described in Example 1). The nitrogen pressure in the cylinder was brought up to 14 PSI, and if the flange did not have a total seal at a given flange pressure, the number of minutes which elapsed while the pressure decayed to 13 PSI was measured. The lower the flange pressure at which a total seal is achieved, the better the results, and if a total seal cannot be achieved at any flange pressure, the longer the pressure is held, the better the result. This test was done on a smooth flange measuring 18 Ra. The control of this test is the result reported for gasket A of Example 1, which held the pressure only for 1.5 minutes and required a flange pressure of 2100 PSI. The edge sealed gasket of this example delivered a total seal (pressure never decreased in the cylinder) at the flange pressure of only 300 PSI.

Example 8

Coatings which a gasket is given which function to increase sealability in the gasket have been found to damage the gasket's resistance to failure under pressure (compression failure resistance). Furthermore, even when a strip of sealing coating is put on the gasket face, even if the coating covers less than 30% of the gasket face (in a preferred embodiment), compression failure resistance is detrimentally affected. Thus it is important to limit the amount of coating for sealing ability that goes on the gasket face. This example is added to demonstrate the effect of the coating for sealing ability on compression failure resistance. This example demonstrates the need to limit both the width and thickness of the sealing coating put on the face of the gasket, this example also demonstrates that the most preferred gasket for compression failure resistance has an edge seal with substantially none of the seal coating on the face of the gasket. When there is substantially no sealing coat lapping onto the face (some small amount may be found at the edges) there will be substantially no effect on compression failure resistance. This is seen from comparing the results of Sample A and Sample B of the table below. At all pressure levels the performance of Sample B was comparable to the performance of Sample A even at the high pressure levels.

To show the effects of the edge coating and the face coating given near the vertical edge of the gasket, identical annular gasket rings were cut and were given the different coatings indicated below. The control was given no coating at all. Measurements for the gaskets are the same as is indicated for the gaskets given the crush test under Example 1.

The compression failure resistance at the temperature of 300° F. was tested for each of the gaskets. The test, known as the crush test is described under ASTM: F1574-95. The deformation of each gasket under the pressure load indicated is stated (as a percentage). The higher the number for each pressure load given, the more deformation there is and the worse the performance of the gasket. Sample A—were the control gaskets with no coating. Sample B—had an edge seal only with substantially no coating put on either face of the gasket. The coating on the edge of the gasket, in fact, resembled the preferred embodiment of FIG. 5. Sample C—had a coating on part of each face of the gasket. The coating on each face was 3.2–4.2 mils in thickness and 92 mils wide on the face beginning at the vertical edge (which was not coated). Sample D—had a coating on part of each face of the gasket. The coating on each face was 0.8–1.2 mils in thickness and 92 mils wide on the face beginning at the vertical edge (which was not coated) and moving across the gasket face. Sample E—had a coating on part of each face of the gasket. The coating on each face was 3.2–4.2 mils in thickness and 188 mils wide on the face beginning at the vertical edge (which was not coated) and moving across the gasket. Sample F—had a coating on each face of the gasket. The coating on each face was 0.8–1.2 mils in thickness and 188 mils wide on the face beginning at the vertical edge (which was not coated) and moving across the gasket. Sample G—had a coating on each face of the gasket. The coating on each face was 3.2–4.2 in thickness and 282 mils wide on the face beginning at the vertical edge (which was not coated) and moving across the gasket. Sample H—had a coating on each face of the gasket. The coating on each face was 0.8–1.2 mils in thickness and 282 mils wide on the face beginning at the vertical edge (which was not coated) and moving across the gasket. Sample I—had a release coating on each face of the gasket. The coating on each face was less than 1 mils thick and covered the whole gasket.

The data in the table below confirms that the most narrow band of coating put on the face of the gasket has a better compression failure resistance than a wider band of coating. The thickness of the coating on the face also effects compression failure resistance. In fact it can be noted, that as the thickness went from 0.8–1.2 mills to 3.2–4.2 mills in Samples G and H, where there was a bigger effect and a greater impact on compression failure resistance (giving a worse compression failure resistance with the thicker coating) than there was between Samples D and H (samples having the width varied but the thickness the same). Thus, it is even more important to limit the thickness of the coating on the face of the gasket.

The data in the table below also confirms that the release coating on Sample I had substantially no effect on the compression failure of the gasket. Thus, release coatings (generally less than about 1 mils in thickness) are permitted on the whole gasket face, and compression failure resistance is good to excellent and not detrimentally affected.

TABLE 5

| Sample | 7500 PSI | 10000 PSI | 12500 PSI | 15000 PSI | 20000 PSI |
|---|---|---|---|---|---|
| A | 1.5 | 1.54 | 2.13 | 2.20 | 4.38 |
| B | 2.13 | 2.33 | 3.53 | 3.59 | 4.57 |
| C | 3.76 | 5.42 | 6.28 | 9.53 | 19.51 |
| D | 2.47 | 3.59 | 3.73 | 6.84 | 14.51 |
| E | 8.82 | 14.32 | 16.85 | 28.01 | 42.98 |
| F | 2.35 | 5.98 | 7.79 | 15.49 | 35.00 |
| G | 12.76 | 20.84 | 33.72 | 41.50 | 100.00 |
| H | 1.98 | 5.62 | 12.26 | 31.81 | 43.66 |
| I | 0.56 | 1.03 | 1.60 | 3.16 | 3.54 |

In the table above, the load on each individual gasket sample is indicated in pounds per square inch (PSI). The numbers listed under each pressure level for each of the gasketing samples show the percent increase in the area of the gasket after the load was released. The smaller the percent increase the better is the performance of the gasket.

The small percent increase for the release coated gasket of sample I proves that a release coating less than 1 mil in thickness has no detrimental effect on crush resistance. In fact, the data, overall confirms that the gaskets of the present invention can deliver a good seal and good crush resistance.

We claim:

1. A gasket comprising:

a base sheet of substantially planar contiguous gasket material having a predetermined thickness and two opposed substantially parallel faces;

said base sheet being configured to define at least one interior aperture bounded by a relatively porous edge of said base sheet;

an edge coating disposed on said relatively porous edge of said base sheet, said edge coating at least partially penetrating said relatively porous edge and being formulated and configured to provide an enhanced seal when said gasket is compressed between a pair of flange surfaces;

said opposed faces of said base sheet lying in respective spaced apart facial planes and said edge coating having edge portions adjacent said facial planes, a central portion intermediate said facial planes, a thickness in a direction substantially parallel to said facial planes, and a width in a direction substantially perpendicular to said facial planes;

a face coating on a portion of at least one face of said base sheet, said face coating extending in a strip around said aperture and having a thickness and a width;

said face coating covering less than about 30% of said face.

2. A gasket comprising:

a base sheet of substantially planar contiguous gasket material having a predetermined thickness and two opposed substantially parallel faces;

said base sheet being configured to define at least one interior aperture bounded by a relatively porous edge of said base sheet;

an edge coating disposed on said relatively porous edge of said base sheet, said edge coating at least partially penetrating said relatively porous edge and being formulated and configured to provide an enhanced seal when said gasket is compressed between a pair of flange surfaces;

said opposed faces of said base sheet lying in respective spaced apart facial planes and said edge coating having edge portions adjacent said facial planes, a central portion intermediate said facial planes, a thickness in a direction substantially parallel to said facial planes, and a width in a direction substantially perpendicular to said facial planes;

a face coating on a portion of at least one face of said base sheet, said face coating extending in a strip around said aperture and having a thickness and a width;

said width of said face coating being less than about 1.5 centimeters.

3. A gasket comprising:

a base sheet of substantially planar contiguous gasket material having a predetermined thickness and two opposed substantially parallel faces;

said base sheet being configured to define at least one interior aperture bounded by a relatively porous edge of said base sheet;

an edge coating disposed on said relatively porous edge of said base sheet, said edge coating at least partially penetrating said relatively porous edge and being formulated and configured to provide an enhanced seal when said gasket is compressed between a pair of flange surfaces;

said opposed faces of said base sheet lying in respective spaced apart facial planes and said edge coating having edge portions adjacent said facial planes, a central portion intermediate said facial planes, a thickness in a direction substantially parallel to said facial planes, and a width in a direction substantially perpendicular to said facial planes;

a face coating on a portion of at least one face of said base sheet, said face coating extending in a strip around said aperture and having a thickness and a width;

said face coating being formed of a material different from the material of said edge coating; and said face coating abutting said edge coating around said aperture.

4. A gasket comprising:

a base sheet of substantially planar contiguous gasket material having a predetermined thickness and two opposed substantially parallel faces;

said base sheet being configured to define at least one interior aperture bounded by a relatively porous edge of said base sheet;

an edge coating disposed on said relatively porous edge of said base sheet, said edge coating at least partially penetrating said relatively porous edge and being formulated and configured to provide an enhanced seal when said gasket is compressed between a pair of flange surfaces;

said opposed faces of said base sheet lying in respective spaced apart facial planes and said edge coating having edge portions adjacent said facial planes, a central portion intermediate said facial planes, a thickness in a direction substantially parallel to said facial planes, and a width in a direction substantially perpendicular to said facial planes;

a face coating, on a portion of at least one face of said base sheet, said face coating extending in a strip around said aperture and having a thickness and a width;

said edge coating wrapping around onto said face of said base sheet to form said face coating, said edge coating and said face coating being contiguous and of the same material; and said face coating covering no more than about 30 percent of said face.

5. A gasket comprising:

a base sheet of substantially planar contiguous gasket material having a predetermined thickness and two opposed substantially parallel faces;

said base sheet being configured to define at least one interior aperture bounded by a relatively porous edge of said base sheet;

an edge coating disposed on said relatively porous edge of said base sheet, said edge coating at least partially penetrating said relatively porous edge and being formulated and configured to provide an enhanced seal when said gasket is compressed between a pair of flange surfaces;

said opposed faces of said base sheet lying in respective spaced apart facial planes and said edge coating having edge portions adjacent said facial planes, a central portion intermediate said facial planes, a thickness in a direction substantially parallel to said facial planes, and a width in a direction substantially perpendicular to said facial planes;

a face coating on each of said faces of said base sheet, each of said face coatings extending in a strip around said aperture and having a thickness and a width; and each of said face coatings covering at most about 30 percent of its respective face.

6. A gasket comprising:

a base sheet of substantially planar contiguous gasket material having a predetermined thickness and two opposed substantially parallel faces;

said base sheet being configured to define at least one interior aperture bounded by a relatively porous edge of said base sheet;

an edge coating disposed on said relatively porous edge of said base sheet, said edge coating at least partially penetrating said relatively porous edge and being formulated and configured to provide an enhanced seal when said gasket is compressed between a pair of flange surfaces;

said opposed faces of said base sheet lying in respective spaced apart facial planes and said edge coating having edge portions adjacent said facial planes, a central portion intermediate said facial planes, a thickness in a direction substantially parallel to said facial planes, and a width in a direction substantially perpendicular to said facial planes;

a face coating on each of said faces of said base sheet, each of said face coatings extending in a strip around said aperture and having a thickness and a width; and said width of each of said face coatings being at most about 1.5 centimeters.

7. A gasket comprising a base sheet of substantially planar contiguous gasket material having a predetermined thickness and spaced apart substantially parallel faces lying in respective facial planes, said base sheet being configured to define an interior aperture bounded by a relatively porous edge of said base sheet, said edge extending between said facial planes, and a relatively impervious edge coating formed on said relatively porous edge of said base sheet, said edge coating extending around said aperture and at least partially penetrating the pores of said relatively porous edge for enhancing the sealing properties of said gasket when said gasket is compressed between a pair of flanges;

a face coating on at least one of said faces of said base sheet, said face coating extending in a strip around said aperture and having a thickness and a width; and said width of said face coating being predetermined to insure that said face coating covers less than about 30 percent of said face.

8. A gasket comprising a base sheet of substantially planar contiguous gasket material having a predetermined thickness and spaced apart substantially parallel faces lying in respective facial planes, said base sheet being configured to define an interior aperture bounded by a relatively porous edge of said base sheet, said edge extending between said facial planes, and a relatively impervious edge coating formed on said relatively porous edge of said base sheet, said edge coating extending around said aperture and at least partially penetrating the pores of said relatively porous edge for enhancing the sealing properties of said gasket when said gasket is compressed between a pair of flanges;

a face coating on at least one of said faces of said base sheet, said face coating extending in a strip around said aperture and having a thickness and a width;

said face coating being formed of a material different from the material of said edge coating; and said face coating abutting said edge coating around said aperture.

9. A gasket comprising a base sheet of substantially planar contiguous gasket material having a predetermined thickness and spaced apart substantially parallel faces lying in respective facial planes, said base sheet being configured to define an interior aperture bounded by a relatively porous edge of said base sheet, said edge extending between said facial planes, and a relatively impervious edge coating formed on said relatively porous edge of said base sheet, said edge coating extending around said aperture and at least partially penetrating the pores of said relatively porous edge for enhancing the sealing properties of said gasket when said gasket is compressed between a pair of flanges;

a face coating on each of said faces of said base sheet, said face coatings extending in a strip around said aperture and having a thickness and a width;

said edge coating wrapping onto said faces to form said face coatings, said edge coating and said face coatings being formed of the same material; and each of said face coatings having a thickness and a width and wherein said width of said face coatings is predetermined to insure that no more than 30 percent of said faces are covered by said face coatings.

10. A gasket as claimed in claim 9 and wherein said thickness of said face coatings is no more than about 11 mils.

* * * * *